Dec. 30, 1969 — C. E. PARKS — 3,486,194
EXTRUDER
Filed Aug. 7, 1967
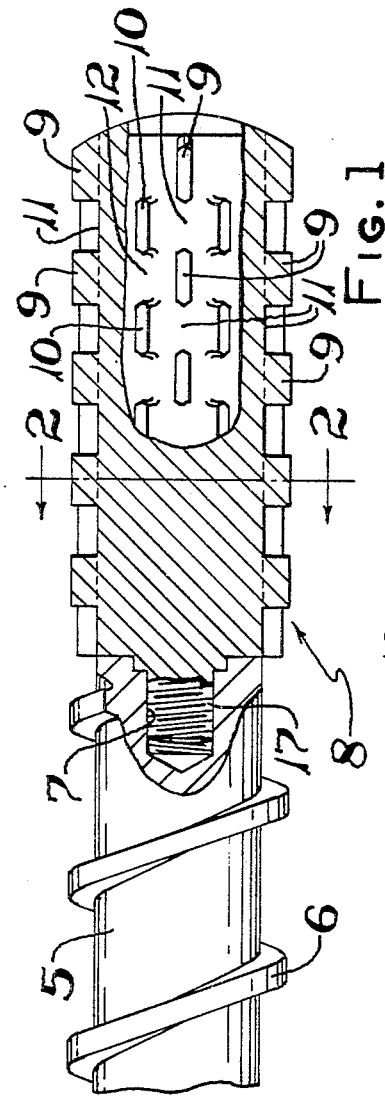
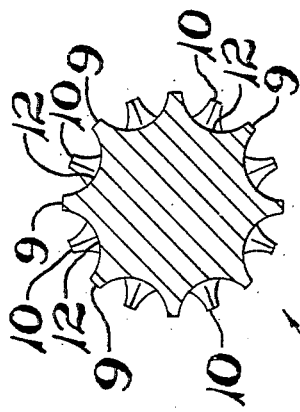
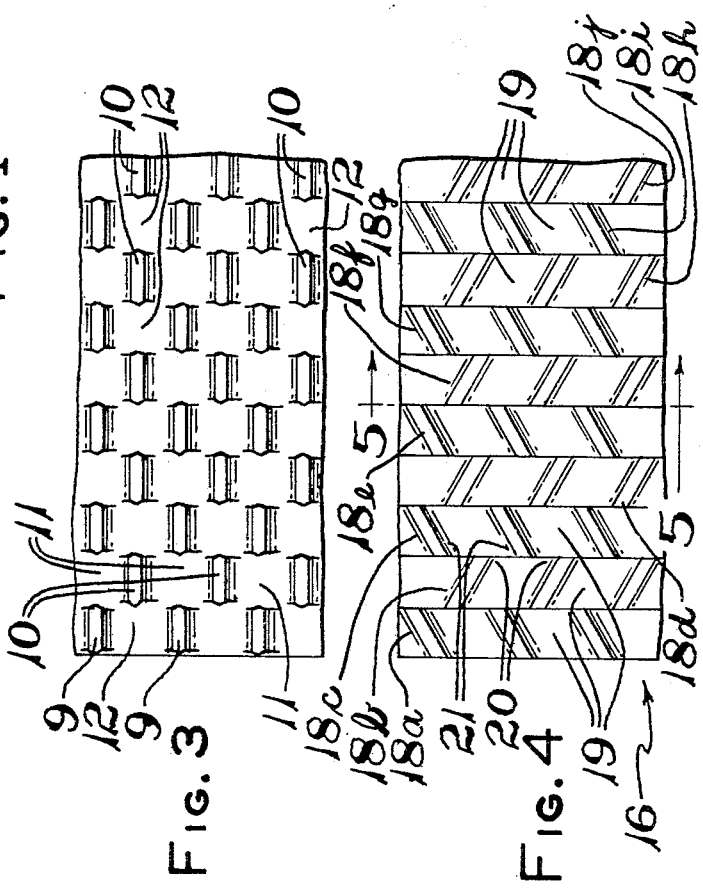
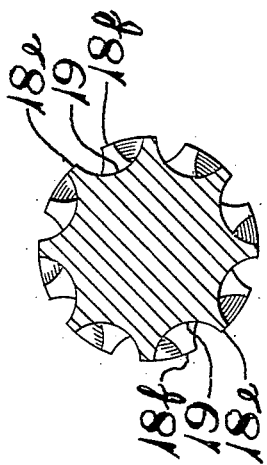
INVENTOR.
CLARENCE E. PARKS
BY Joseph Januszkiewicz
ATTY.

United States Patent Office 3,486,194
Patented Dec. 30, 1969

3,486,194
EXTRUDER
Clarence E. Parks, 24311 W. Lake Road,
Bay Village, Ohio 44140
Filed Aug. 7, 1967, Ser. No. 658,671
Int. Cl. B29f 3/02
U.S. Cl. 18—12                                                                 3 Claims

ABSTRACT OF THE DISCLOSURE

An extruding screw having conveying flights and a forwardly disposed torpedo with series of rows of flights which are arranged to bisect the material being moved forwardly from the preceding flights.

Background of the invention

This invention relates to an improved mixing screw for a plastics extrusion machine, and more particularly to a torpedo that may be used in conjunction with a standard extruder screw.

The mixing and working of plasticizing substances with screw presses has generally been accomplished in various phases or portions of the extruder screw. In those situations where the working is desired to be performed at the torpedo exclusively, difficulty has been encountered to achieve a thoroughly mixed material since the plastic material must receive a thorough mixing only at the forward portion of the extruding screw. In these situations, it is desirable to use that portion rearwardly of the torpedo only for conveying.

Summary of the invention

In the present invention, it is proposed to provide an extruding screw having a torpedo design which will assure adequate mixing and blending of thermoplastic materials including where desired the thorough blending of thermoplastic materials with modifying materials such as plasticizers, lubricants, pigments or dyes.

It is an object of this invention to provide a new and improved invention whereby the extrusion device includes a mixing section or torpedo that may be connected to a helical screw or may be integrally formed with the extruder screw whereby the mixing efficiency of the extruder is markedly increased without markedly increasing the power required to advance the plasticated material through the mixing section.

It is another object of this invention to provide a torpedo of novel design which provides a thoroughly mixed extrudate.

A further object of this invention is to provide a new and improved torpedo having a novel arrangement of flights which improves the mixing quality of an extruder.

Another object of this invention is to provide a novel torpedo for use with a conveying screw in an extruder which assures thorough mixing in the working zone of the extruder without preliminary mixing.

These and other objects achieved by this invention will become apparent as this description proceeds in connection with the accompanying drawing.

Brief description of the drawings

FIGURE 1 shows a side view of a mixing screw with a portion shown in cross section having a threaded coupling screwed into a suitable tap of an extruder screw.

FIGURE 2 is a cross-sectional view of a mixing screw taken along the line 2—2 of FIGURE 1.

FIGURE 3 is a plan view of the mixing screw or torpedo showing the flight design projected on a flat surface.

FIGURE 4 is a plan view of a modified mixing screw or torpedo showing the flight design projected on a flat surface.

FIGURE 5 is a cross-sectional view of a mixing screw taken along the line 5—5 of FIGURE 4.

Detailed description

Referring to the drawings, FIGURE 1 discloses an extruder screw 5 of conventional design having a helical single flight 6 extending continuous for the entire length thereof. Thus, the screw 5 is so designed that granular, powdered, flaky or cubed thermoplastic materials may be fed from a suitable hopper along the single flighted screw 5 for conveyance to the forward portion of the screw 5. The forward end of screw 5 is threaded as at 7 to receive the threaded end 17 of an elongated torpedo 8. Torpedo 8 has staggered series of parallel flights 9 and 10 wherein the series of flights 9 are in parallel rows with the flights 9 in the parallel rows also being in circumferentially spaced alignment defining concave recesses 11 between laterally adjacent flights. Flights 10 are in a series of parallel rows with the flights 10 in the parallel rows also being in circumferentially spaced alignment defining concave recesses 12 between laterally adjacent flights 10. The flights 9 and 10 are in staggered relationship relative to each other to assure adequate mixing to thereby improve the quality of the extrudate.

In operation of the above described torpedo or mixing screw, materials are fed into a hopper for conveyance, by the flights 6 of the screw 5, towards the torpedo 8 for working. With the torpedo 8 being rotated at a suitable speed from drive means (not shown), the thermoplastic materials are worked whereby the materials are plasticized. Such working of the thermoplastic materials is achieved by a balanced torpedo 8 which raises the temperature of the materials to assure proper mixing and consistency before extrusion of the materials through a suitable apertured forming die. The thin flights which are parallel to the axis of the screw split and divide the plastic material from the valley or recess of the preceding flight to thoroughly mix the materials.

FIGURES 4 and 5 disclose a further variation on the above described embodiment wherein there is shown a torpedo or mixing screw 16 which permits rapid removal from the extruder screw as described and shown in the first embodiment. Torpedo 16 has a plurality of rows of flights indicated as 18a through 18j, inclusive. Each row has lateral spaced flights of helical design with arcuately shaped recesses 19 therebetween. The flights of each row staggered such that the space between two adjacent forward portions of the flights in row 18b designated as 20 in FIGURE 4 are bisected by the rearward portion of the flights 18c, which rearward portions are designated as 21. The remaining rows have their adjacent end portions in similar relationship.

In operation of the modified embodiment, thermoplastic material is fed into a hopper for conveyance by the screw similar to screw 5 described above towards the torpedo 16 for working. With the torpedo 16 being rotated from drive means (not shown), the thermoplastic materials are worked whereby the materials are plasticized. The staggered flights operate to split and divide the plastic material from the valley of the preceding flights to thereby provide a thoroughly mixed extrudate.

Obviously many modifications and variations of the present invention are possible in the light of the above teachings. It is therefore to be understood that within the scope of the appended claims, the invention may be practiced otherwise than as specifically described.

I claim:

1. An extruding device comprising: a mixing screw for rotation within a stationary cylindrical barrel; said screw having a first series of rows of flights wherein said flights in each row are in longitudinally spaced alignment and said rows are parallel to the axis of said screw; said flights of said first series having concave recesses between laterally adjacent flights; a second series of rows of flights wherein the flights of said second series in each row are in longitudinally spaced alignment and said rows of said second series are parallel to said axis of said screw; said flights of the second series having concave recesses between laterally adjacent flights; each of said flights having a leading edge and a trailing edge; said flights of said first series of rows are in staggered lateral relationship to said flights in said second series of rows; said leading edges of forwardly disposed flights bisect the concave recesses between adjacent trailing edges of flights; and said leading edge of said second series of rows of flights being in lateral alignment with the adjacent said trailing edges of said flights of said first series of rows.

2. An extruding device as set forth in claim 1 wherein said flights are narrow radially outwardly extending projections with said concave arcuately shaped recesses between laterally adjacent projections.

3. An extruding device for use in an extruder comprising a longitudinally extending screw member, said screw member having a rearwardly disposed conveying section with flights of helical design, said screw member having a forwardly disposed torpedo section, said torpedo section having a first series of rows of flights, said flights in each of said rows being in longitudinal spaced alignment, said torpedo section having a second series of rows of flights, said flights in each of said rows of said second series being in longitudinal spaced alignment, a concave recess defined by laterally adjacent ones of said flights, each of said flights having a leading edge and a trailing edge, said leading edges of said first series of flights being in alignment with said trailing edges of adjacent pair of said second series flights, and all of said flights having a helix contour relative to the longitudinal axis of said screw member.

References Cited
UNITED STATES PATENTS

| | | | |
|---|---|---|---|
| 2,662,243 | 12/1953 | Schauck et al. | 18—12 |
| 3,026,273 | 3/1962 | Engles. | |
| 3,045,283 | 7/1962 | Keiser | 18—12 XR |
| 3,174,185 | 3/1965 | Gerber | 18—12 |
| 3,344,215 | 9/1967 | De Witz et al. | 18—12 XR |

WILLIAM J. STEPHENSON, Primary Examiner